(12) United States Patent
Scholfield

(10) Patent No.: US 12,433,271 B2
(45) Date of Patent: Oct. 7, 2025

(54) APPARATUS FOR ATTACHING A HOOK TO A FISHING LURE OR BAIT

(71) Applicant: Max Scholfield, Bella Vista, AR (US)

(72) Inventor: Max Scholfield, Bella Vista, AR (US)

( * ) Notice: Subject to any disclaimer, the term of this patent is extended or adjusted under 35 U.S.C. 154(b) by 0 days.

(21) Appl. No.: 18/544,052

(22) Filed: Dec. 18, 2023

(65) Prior Publication Data

US 2025/0194574 A1    Jun. 19, 2025

(51) Int. Cl.
*A01K 83/06*    (2006.01)

(52) U.S. Cl.
CPC .................................. *A01K 83/064* (2022.02)

(58) Field of Classification Search
CPC ...... A01K 83/064; A01K 83/06; A01K 83/02; A01K 91/04; A01K 85/02; A01K 97/06
USPC .................. 43/44.8, 44.2, 41.2, 42.08, 42.1; D22/144
See application file for complete search history.

(56) References Cited

U.S. PATENT DOCUMENTS

| | | | | |
|---|---|---|---|---|
| 1,899,790 A * | 2/1933 | Blum | ...................... | A01K 83/06 43/44.2 |
| 2,157,333 A * | 5/1939 | Hadaway | ............... | A01K 83/06 43/44.2 |
| 2,192,800 A * | 3/1940 | Peterson | ................ | A01K 83/06 43/44.4 |
| D138,498 S * | 8/1944 | Baird | .......................... | D22/144 |
| 3,040,466 A * | 6/1962 | Jablonski | ............... | A01K 85/02 43/42.49 |
| 3,200,532 A * | 8/1965 | Walton | .................... | A01K 83/06 43/44.8 |
| 3,284,945 A * | 11/1966 | Kurtis | ..................... | A01K 83/06 43/44.2 |
| 3,400,484 A * | 9/1968 | Beard | ..................... | A01K 83/06 43/44.8 |
| 3,986,291 A * | 10/1976 | Hopper | ................... | A01K 85/00 43/42.28 |
| 4,790,101 A * | 12/1988 | Craddock | .............. | A01K 85/02 43/42.24 |
| 6,085,456 A * | 7/2000 | Battaglia | ................ | A01K 83/00 43/44.8 |
| 6,665,978 B1 * | 12/2003 | Reed | ...................... | A01K 83/06 43/44.4 |
| D687,918 S * | 8/2013 | Paredes | ........................ | D22/144 |
| D794,159 S * | 8/2017 | Raisanen | ..................... | D22/149 |
| D805,159 S * | 12/2017 | Grant | ........................... | D22/129 |
| 11,716,978 B1 * | 8/2023 | Mongold | ............... | A01K 85/00 43/42.43 |
| 2012/0216443 A1 * | 8/2012 | Merritt | .................... | A01K 83/06 43/44.81 |
| 2014/0150329 A1 * | 6/2014 | Waldroup | .............. | A01K 85/14 43/42.32 |
| 2016/0242400 A1 * | 8/2016 | Grant | ..................... | A01K 83/06 |

(Continued)

*Primary Examiner* — Zoe Tam Tran
(74) *Attorney, Agent, or Firm* — Richard A. Fagin

(57) ABSTRACT

An apparatus for attaching a fishing hook to a bait or lure has a base having a flat bottom surface. The bottom surface has slots on opposed sides and an opening. A post is attached to or is formed with the base and extends perpendicularly to the surface. The post has a tapered end opposed to the base and at least one opening therein for disposing a fishing hook. The at least one opening comprises overlapping circular apertures. The apertures are arranged to enable passage therethrough of the fishing hook only when a barbed end thereof is aligned with an axis connecting centers of the apertures.

6 Claims, 4 Drawing Sheets

(56) References Cited

U.S. PATENT DOCUMENTS

| | | | | |
|---|---|---|---|---|
| 2019/0269113 A1* | 9/2019 | Olson | .................... | A01K 83/06 |
| 2020/0128803 A1* | 4/2020 | Nahvi | .................... | A01K 83/06 |
| 2020/0229413 A1* | 7/2020 | Snopkowski | .......... | A01K 91/04 |

* cited by examiner

APPARATUS FOR ATTACHING A HOOK TO A FISHING LURE OR BAIT

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of fishing lures and hooks. More specifically, the disclosure relates to devices for attaching fishing hooks to bait (lures).

So called "soft" bait, or lures, are plastic representations of bait species used to attract fish. The soft bait may have one or more hooks attached directly or proximately to catch fish that attack the soft bait. Various type of soft bait and devices for attaching hooks to such bait are described, for example in U.S. Pat. No. 7,971,387 issued to Huddleston, which discloses a device for supporting a soft-bodied lure or bait. The device includes a brace with a connector and a stop. Optionally, the brace is formed from a loop of wire. In some embodiments, the connector may be formed by the loop. A stop may be sized and weighted to form weights. In an optional embodiment. The device may be received into an open-ended channel in the body of a lure or bait. The connector protrudes through one end of the channel and the stop protrudes through another end of the channel. A fishing line may be connected to the connector through a hook or the like received by the connector.

Another lure and attachment device are described in U.S. Pat. No. 9,253,966 issued to Scholfield. The disclosed device includes a rivet is insertable into the lure body and that can function as a conduit to the fishing line. The rivet can be connected to a jig weight and can be formed with a single twisted wire forming an eye for engaging a hook barb. A lure attachment can be connected to the rivet, or between the rivet and lure body, to modify the shape, movement, or sensory attributes of the fishing jig. The rivet permits attachment of the line and of jig weights and hooks at selected locations along the length of a soft lure body, significantly extending the operating life of the jig body and by changing the functional operation of the jig when cast into, resting in, or retrieved through the water.

Another such device for attaching hooks to lures or baits is sold under the trade name Geecrack Neko Hack Soft Bait Rigging Accessory. GEECRACK is a registered trademark of Geecrack USA, Inc., Corinth, Texas. The Neko Soft Bait Rigging Accessory includes a pin or post disposed on a transversely formed or mounted base. The pin or post is pushed through the bait body until the base contacts the bait body. Any excess length of the post of pin protruding through the bait body may be cut off, and a fishing hook may be inserted by the barb end through a suitable hole or opening in the post. Fishing line may then be attached to the hook in any conventional manner.

Some limitations of the above described attachments, i.e., Neko Soft Bait Rigging Accessory, may include one or more of the following. The attachment may be specific to one type or band of bait; Holes in the pin or post may only fit one size bait, requiring multiple sizes of device. The hole design may make using the device with small or extra large hooks to be impractical. Feet on the bait are used to stabilize the bait and keep it from spinning.

Accordingly, there is a need for improved devices for attaching fishing hooks to lures or bait.

SUMMARY

One aspect of the present disclosure is an apparatus for attaching a fishing hook to a bait or lure. An apparatus according to this aspect has a base having a flat bottom surface. The bottom surface has slots on opposed sides and an opening. A post is attached to or is formed with the base and extends perpendicularly to the surface. The post has a tapered end opposed to the base and at least one opening therein for disposing a fishing hook. The at least one opening comprises overlapping circular apertures. The apertures are arranged to enable passage therethrough of the fishing hook only when a barbed end thereof is aligned with an axis connecting centers of the apertures.

In some embodiments, a width dimension of the post is chosen to eliminate rotation of the apparatus within the bait or lure.

In some embodiments, the base and the post are formed from nylon.

Some embodiments further comprise a plurality of spaced apart apertures disposed along a longitudinal dimension of the post.

In some embodiments, the base comprises slots on opposed sides thereof, the slots having dimensions chosen to enable frictional engagement of a fishing line to the base.

In some embodiments, the base comprises an opening therethrough for attachment of an accessory to the bait or lure.

A method for attaching a fishing hook to a bait or lure according to another aspect of the present disclosure includes pushing a post of an apparatus through a body of the bait or lure. The apparatus has a base having a flat bottom surface. The bottom surface has slots on opposed sides and an opening. The post is attached to or formed with the base and extends perpendicularly to the surface. The post has a tapered end opposed to the base and at least one opening therein for disposing a fishing hook. The at least one opening comprises overlapping circular apertures. The apertures are arranged to enable passage therethrough of the fishing hook only when a barbed end thereof is aligned with an axis connecting centers of the apertures. The pushing continues until the base is proximate to the bait or lure. The fishing hook is through the at least one aperture; and an excess part of the post protruding from the bait or lure beyond the at least one opening is cut off.

Some embodiments further comprise attaching a fishing line to the base by inserting the fishing line through slots formed in opposed sides of the base to frictionally engage the fishing line to the base.

Some embodiments further comprise attaching an accessory to the base through an opening in the base.

Other aspects and possible advantages will be apparent from the description and claims that follow.

DETAILED DESCRIPTION

Figure 1:
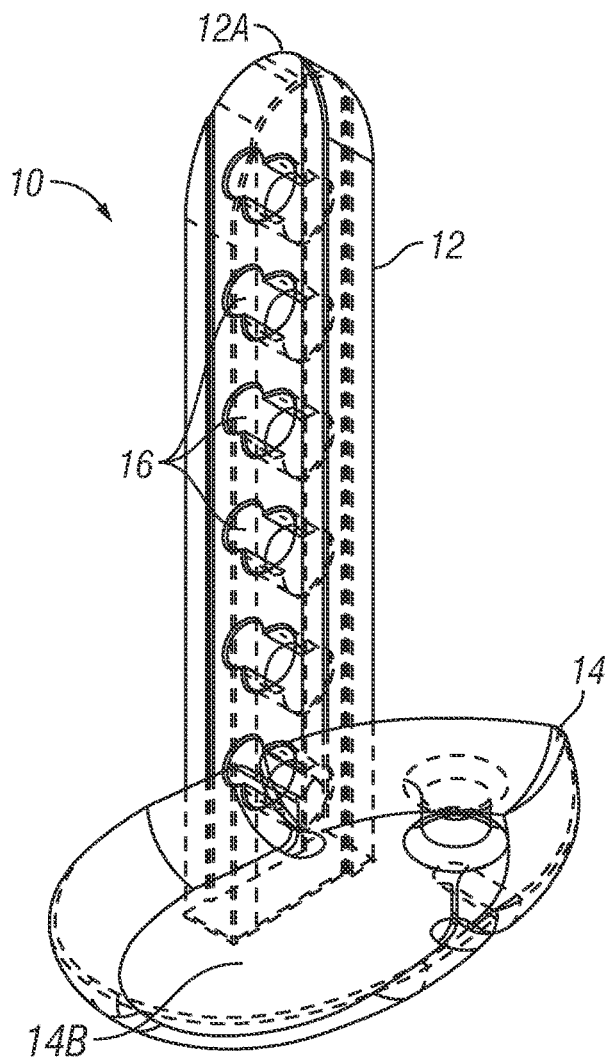
FIG. 1 shows an oblique view of an example embodiment of a hook attachment apparatus according to the present disclosure.
Figure 2:
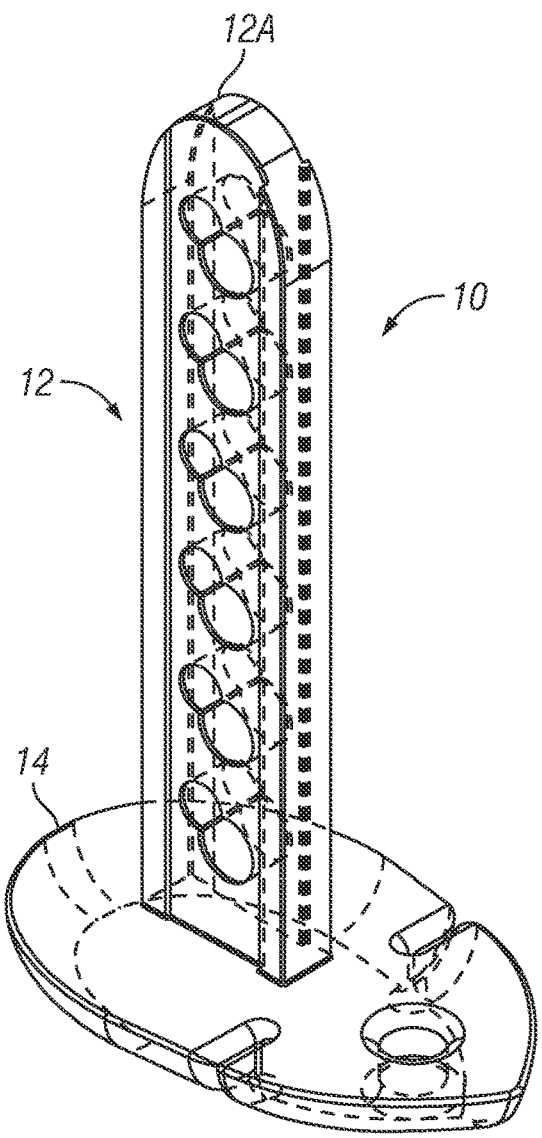
FIG. 2 shows a rotated oblique view of the apparatus shown in FIG. 1.

FIGS. 1 and 2 show oblique views of an example embodiment of a hook attachment apparatus 10 (apparatus) according to the present disclosure. The apparatus may be made from plastic, such as nylon, which may be nylon 6/6 in some embodiments. The apparatus 10 may comprise a post 12 shaped to enable push through by hand of the apparatus 10 through a bait or lure (not shown in FIG. 1 or 2). The post 12 may comprise a tapered end or a blunt or radiused pointed end, shown generally at 12A to facilitate insertion of the post 12 through the body of a lure or bait (see FIGS. 7 and 8). The post 12 may comprise a plurality of longitudinally separated openings 16 for insertion of a hook (see FIGS. 7 and 8). The structure of the openings 16 will be further explained below with reference to FIGS. 5 and 6. A generally flat-bottomed base 14 may be formed with or attached to the post 12. A flat bottom surface 14B on the base 14 may in some embodiments be transverse to the longitudinal dimension of the post 12. The base 14 may be attached to the post 12 such as by adhesive or thermal welding, or the base 14 may be formed integrally with the post 12.

Figure 3:
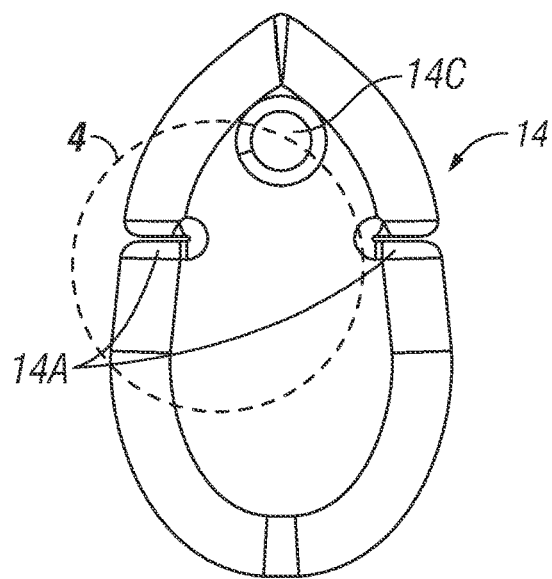
FIG. 3 shows a bottom view of the apparatus of FIG. 1.

FIG. 3 shows a plan view of the bottom surface 14B of the base 14 to illustrate certain features. The base 14 may comprise a first, generally round or oblong opening 14C which may be used for attaching accessories such as spinners or trailer hooks. The accessories may pass through the opening and then wrap around the post 12 for security. The base 14 may comprise elongated slots 14A on opposed sides of the base 14 to enable insertion of a fishing line (not shown) such that the fishing line (not shown) may be attached to and retained by the base 14 using only friction between the line (not shown) and the material of the base 14. The foregoing enables attachment of the line (not shown) without the need for knotting or other attachment feature to attach, for example a weight to the bait or lure.

Figure 4:
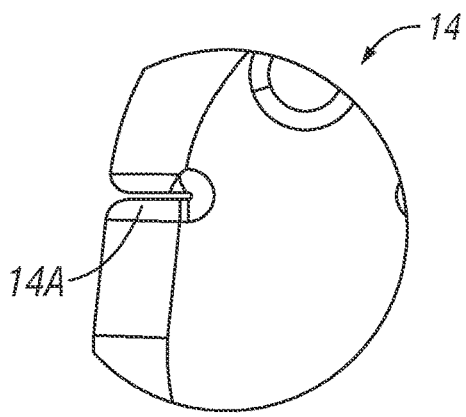
FIG. 4 shows an enlarged portion of the bottom view of FIG. 3.

FIG. 4 shows a portion of the base 14 in enlarged view to better illustrate one of the slots 14A.

Figure 5:
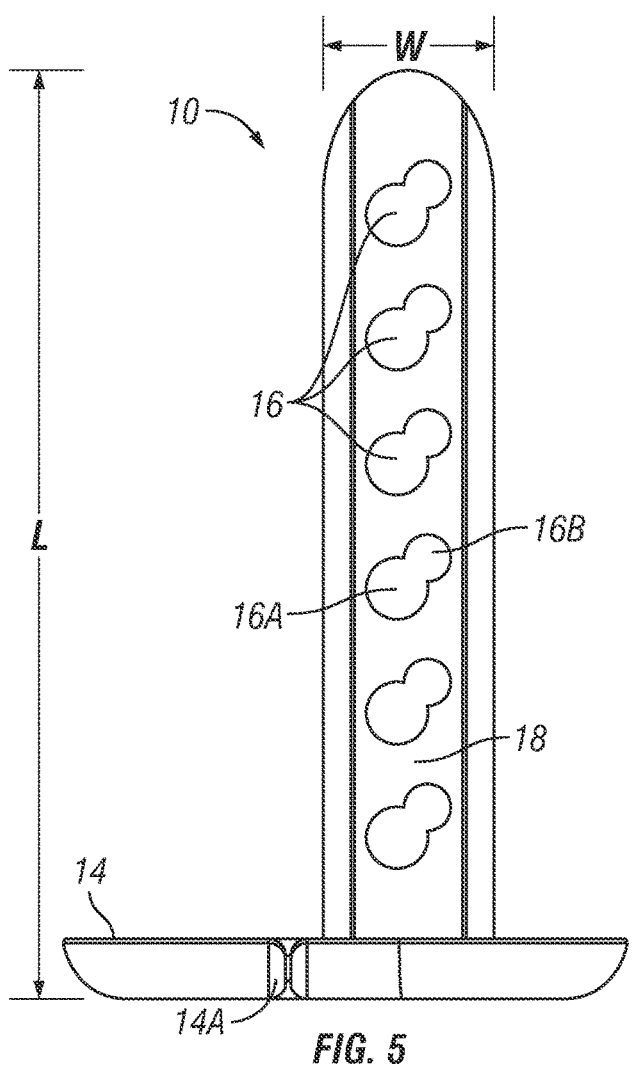
FIG. 5 shows a side vertical elevation view of the apparatus of FIG. 1.
Figure 6:
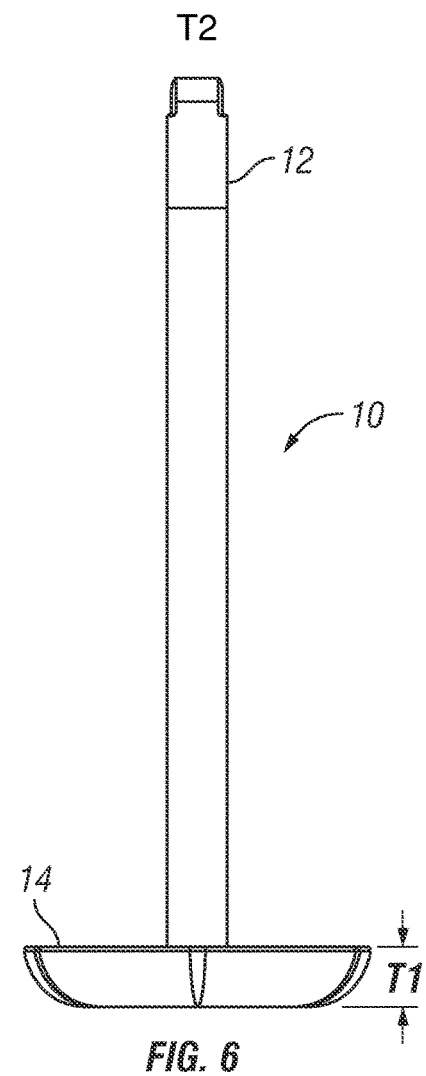
FIG. 6 shows a view of the apparatus corresponding to FIG. 5, rotated 90 degrees.

FIG. 5 shows a side vertical elevation view of the apparatus of FIG. 1. FIG. 6 shows a view of the apparatus corresponding to FIG. 5, rotated 90 degrees. In FIG. 5, the post 12 is shown in its width dimension W, wherein the plurality of openings 16 is shown in longitudinally spaced apart arrangement along the length of the post 14. The openings 16 may be spaced apart to enable the apparatus 10 to be fully inserted through a wide size range of bait or lures (not shown). In use, the apparatus 10 is inserted through the body of the lure or bait by pushing on the base 14 as the post 12 penetrates the bait body (not shown). Any part of the post 12 protruding from the bait body beyond the one of the openings through which a hook may be inserted may be cut off.

The width dimension W of the post 12 may be chosen to provide the post 12 with a cross-section that will cause the apparatus 10 to resist being rotated about the post 12 when the post 12 is inserted into a bait or lure. The thickness dimension of the base T1 may be chosen to facilitate friction fit of fishing line, etc. in the slots (14A in FIG. 3).

The openings 16 may each comprise partially overlapping round apertures 16A, 16B to enable insertion of a hook (not shown) through one of the openings 16 by its barbed end opposed to its attachment eye (not shown). Thus, the hook (not shown) may be pre-assembled to a fishing line (not shown) prior to assembly of the hook (not shown) to the apparatus 10. Further, the sizes of the apertures 16A, 16B and the amount of overlap may be chosen to enable use of a wide range of hook sizes. The aperture structure may enable restricting the size of the apertures 16A, 16B to accept the barb and the wire size of the hook allowing the barb to restrict exit of the hook when the barb is not aligned with the apertures 16A, 16B. A common axis 18 connecting the centers of each of the two apertures 16A, 16B in each opening 16 may be oblique to the longitudinal dimension L and the width W of the post 12 to enable larger apertures 16A, 16B than may be possible if the common axis 18 were parallel to the width W, or expressed conversely, the width W may be minimized with respect to the chosen sizes of the apertures 16A, 16B.

Figure 7:
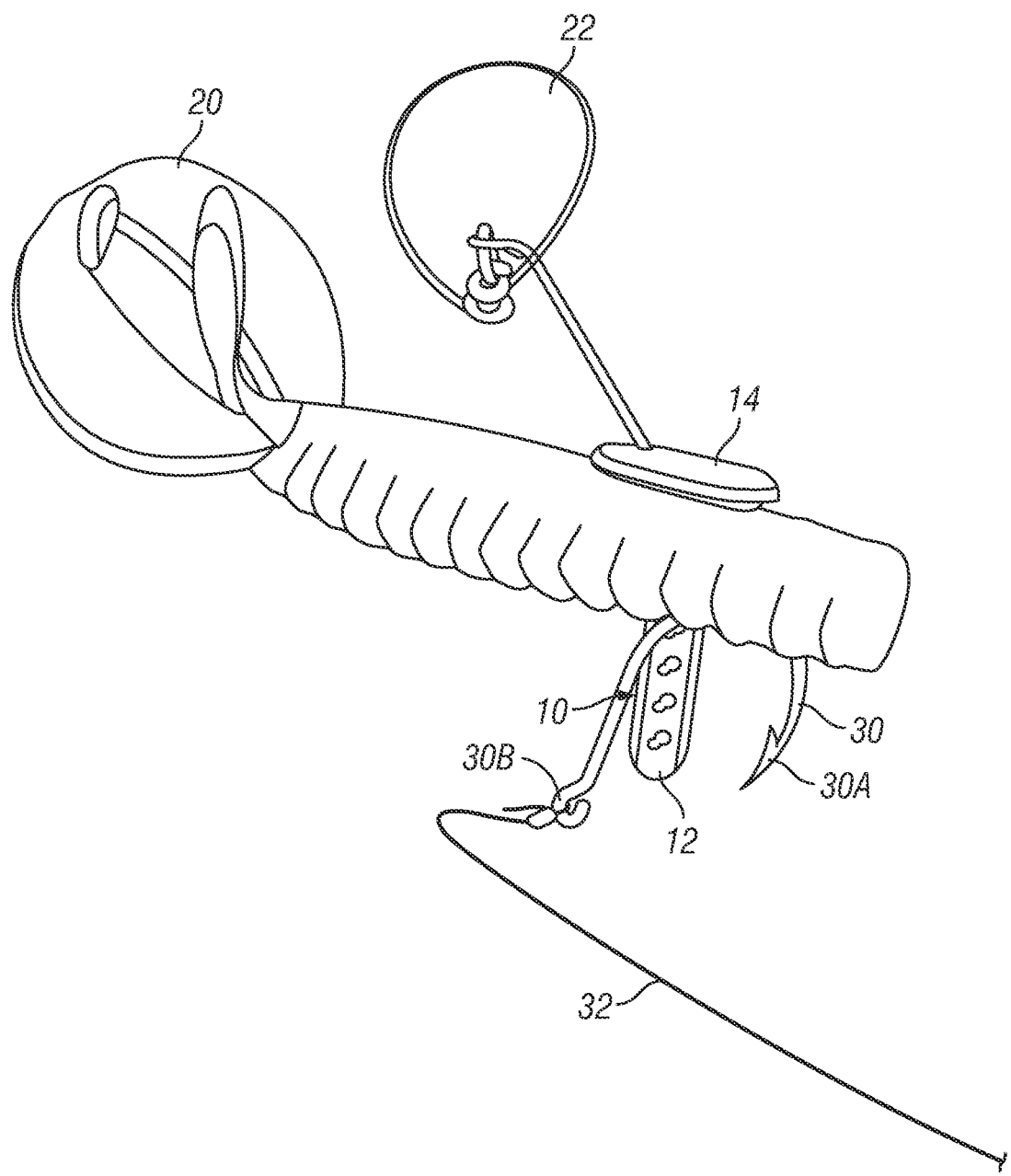
FIG. 7 shows the apparatus of FIG. 1 inserted though a lure or bait, with a hook attached.

FIG. 7 shows the apparatus 10 after it is inserted into a bait or lure 20. The apparatus 10 may be so inserted by the user pushing on the base 14 to enable the post 12 to penetrate the body of the lure or bait 20. When the apparatus 10 is fully inserted into the lure 20, the base 14 will be in contact or close proximity with the lure body. A part of the post 12 may protrude from the lure body, the length of which part will depend on the thickness of the lure body. After insertion is completed, a hook 30 may be attached to the post 12 by inserting the barb end 30A of the hook 30 through the exposed opening 16 closest to the lure body. The foregoing may eliminate the need for knotting or other attachment feature to connect fishing line 32 to a weight at the end of the line commonly referred to as "drop shot."

Figure 8:
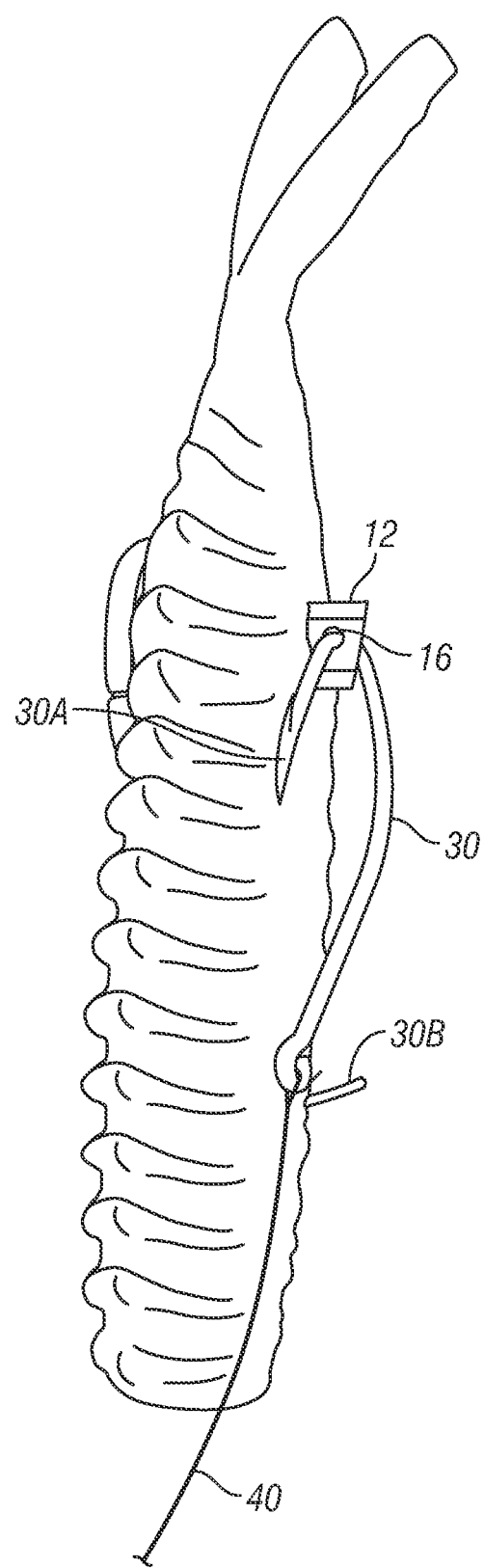
FIG. 8 shows the arrangement of FIG. 7, wherein the excess of a post part of the apparatus has been clipped off.

FIG. 8 shows the arrangement of FIG. 7 wherein part of the post 12 beyond the one of the openings 16 through which the hook 30 is inserted is cut off. A fishing line 32 may be affixed to the opposed end 30B of the hook 30. In some embodiments, fishing line may be attached to the base 14 by friction fit into the slots (14A in FIG. 3), thus eliminating the need for knotting or other attachment feature to connect the fishing line to the base 14, such as, for example, to attach a weight.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. An apparatus for attaching a fishing hook to a bait or lure, comprising:
    a base having a flat bottom surface, the flat bottom surface having slots on opposed sides and an opening through the base;
    a post attached to or formed with the base at one end of the post, the post extending perpendicularly to the flat bottom surface of the base, the post having a tapered end opposed to the one end attached to or formed with the base, the post having at least one opening therethrough for disposing a fishing hook, the at least one opening comprising overlapping circular apertures, the overlapping circular apertures arranged to enable passage therethrough of the fishing hook at a barbed end thereof only when the barbed end is aligned with an axis connecting centers of the overlapping circular apertures.

2. The apparatus of claim 1 wherein a width dimension of the post is chosen to eliminate rotation of the apparatus when inserted into a bait or lure.

3. The apparatus of claim 1 wherein the base and the post are formed from nylon.

4. The apparatus of claim 1 further comprising wherein the at least one opening comprises a plurality of spaced apart openings disposed along a longitudinal dimension of the post, each of the plurality of spaced apart openings comprising overlapping circular apertures, the overlapping circular apertures arranged to enable passage therethrough of a fishing hook at a barbed end thereof only when the barbed end is aligned with an axis connecting centers of the overlapping circular apertures.

5. The apparatus of claim 1 wherein the slots on opposed sides of the base have dimensions chosen to enable frictional engagement of a fishing line to the base.

6. The apparatus of claim 1 wherein the opening through the base enables attachment of an accessory to the bait or lure.

* * * * *